United States Patent
Lu et al.

(10) Patent No.: US 10,558,984 B2
(45) Date of Patent: Feb. 11, 2020

(54) METHOD, APPARATUS AND SERVER FOR IDENTIFYING RISKY USER

(71) Applicant: Baidu Online Network Technology (Beijing) Co., Ltd., Beijing (CN)

(72) Inventors: Yuan Lu, Beijing (CN); Huijuan Lin, Beijing (CN); Lixia Yang, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 217 days.

(21) Appl. No.: 15/717,555

(22) Filed: Sep. 27, 2017

(65) Prior Publication Data
US 2018/0240133 A1    Aug. 23, 2018

(30) Foreign Application Priority Data
Feb. 20, 2017    (CN) .......................... 2017 1 0089056

(51) Int. Cl.
G06N 20/00    (2019.01)
G06Q 30/00    (2012.01)
(Continued)

(52) U.S. Cl.
CPC ..... *G06Q 30/0185* (2013.01); *H04L 63/1425* (2013.01); *G06N 7/005* (2013.01); *G06N 20/00* (2019.01)

(58) Field of Classification Search
CPC ............ G06Q 30/0185; H04L 63/1425; G06N 20/00; G06N 7/005
See application file for complete search history.

(56) References Cited

U.S. PATENT DOCUMENTS 5,293,422 A *    3/1994    Loiacono ................ G06F 21/10
                                                       705/51
2009/0164517 A1*    6/2009    Shields ................... G06F 21/55
(Continued)

FOREIGN PATENT DOCUMENTS

CN    103853841 A   *   6/2014
CN    105930430 A       9/2016
(Continued)

OTHER PUBLICATIONS

Daniel Dimov, "Chinese Social Media Censorship", Oct. 15, 2014, retrieved from , retrieved on Jun. 17, 2019.*
(Continued)

*Primary Examiner* — Lisa C Lewis
*Assistant Examiner* — Zhimei Zhu
(74) *Attorney, Agent, or Firm* — Nixon Peabody LLP

(57) ABSTRACT

A method and apparatus for identifying a risky user and a server. The method includes: extracting historical published information of users indicated by preset user identifiers; for each user indicated by each of the user identifiers, performing the following steps of identifying a risky user: extracting a feature vector from the historical published information of the user, and inputting the extracted feature vector to a pre-trained information identifying model to obtain an information identifying result corresponding to the historical published information of the user, the information identifying model being used to characterize a corresponding relation between the feature vector and the information identifying result; and determining the user as a risky user, in response to the information identifying result corresponding to the historical published information of the user indicating the historical published information of the user as risk information.

13 Claims, 5 Drawing Sheets

(51) Int. Cl.
*H04L 29/06* (2006.01)
*G06N 7/00* (2006.01)

(56) References Cited

U.S. PATENT DOCUMENTS

2018/0089676 A1* 3/2018 Narasimhan ......... G06Q 20/401
2018/0218123 A1* 8/2018 Gomez Sanchez .... G16H 40/63

FOREIGN PATENT DOCUMENTS

CN 106296195 A * 1/2017
CN 106296195 A   1/2017

OTHER PUBLICATIONS

Kyle Foster, "Can Word Vectors Help Predict Whether Your Chinese Tweet Gets Censored?", Mar 2, 2016, retrieved from , retrieved on Jun. 17, 2019.*

Jin Li, "Predicting Large-Scale Internet Censorship—A Machine Learning Approach", Aug. 2015, master thesis, retrieved from , retrieved on Jun. 17, 2019.*

* cited by examiner

METHOD, APPARATUS AND SERVER FOR IDENTIFYING RISKY USER

CROSS-REFERENCE TO RELATED APPLICATION

This application is related to and claims priority from Chinese Application No. 201710089056.2, filed on Feb. 20, 2017 and entitled "Method, Apparatus and Server for Identifying Risky User", the entire disclosure of which is hereby incorporated by reference.

TECHNICAL FIELD

The present disclosure relates to the field of computer technology, specifically to the field of Internet technology, and more specifically to a method, apparatus and server for identifying a risky user.

BACKGROUND

With the development of Internet technology, it becomes increasingly popular to conduct user transactions (such as product transactions and service transactions) utilizing the Internet. In order to guarantee the safety of conducting transactions utilizing the Internet, it is necessary to identify risky users (e.g., advertisers operating fraudulent websites, merchants selling illegal products, users forging information to defraud loans) and prevent their participation in the transactions.

However, the existing method relies on the identifying by a machine learning model obtained by regularly trained with the user information (e.g., user name, address, email address) This method not only leads to a long renewal period of the machine learning model, but also the prompt modification of the user information to avoid being identified again, when a risky user finds himself being identified. In this regard, there exists a problem that the identifier accuracy is low.

SUMMARY

The objective of the present disclosure is to provide an improved method and apparatus for identifying a risky user and a server, in order to solve the technical problem mentioned in the foregoing Background section.

In a first aspect, the present disclosure provides a method for identifying a risky user, comprising: extracting historical published information of users indicated by user identifiers in a preset set of user identifiers; and for each user indicated by each of the user identifiers in the set of user identifiers, performing following steps of identifying a risky user: extracting a feature vector from the historical published information of the user, inputting the extracted feature vector to a pre-trained information identifying model to obtain an information identifying result corresponding to the historical published information of the user, the information identifying model being used to characterize a corresponding relation between the feature vector and the information identifying result, and determining the user as a risky user, in response to the information identifying result corresponding to the historical published information of the user indicating the historical published information of the user as risk information.

In some embodiments, the method further comprises: using the historical published information indicated as risk information by the information identifying result as historical risk information, and generating a set of historical risk information; receiving an information publishing request sent by a to-be-identified user, the information publishing request including to-be-published information; comparing the to-be-published information with the historical risk information in the set of historical risk information; and determining the to-be-published information as risk information, and determining the to-be-identified user as a risky user, in response to the to-be-published information matching at least one item of the historical risk information.

In some embodiments, the method further comprises: extracting a feature vector from the to-be-published information; inputting the extracted feature vector to the information identifying model to obtain an information identifying result corresponding to the to-be-published information; and determining the to-be-identified user as a risky user, in response to the information identifying result corresponding to the to-be-published information indicating the to-be-published information as risk information.

In some embodiments, after the determining the to-be-identified user as a risky user, the method further comprises: determining the historical published information indicated as non-risk information by the information identifying result as historical non-risk information; and updating the information identifying model, by using the historical risk information, the historical non-risk information and the to-be-published information as training samples.

In some embodiments, after the determining the to-be-identified user as a risky user, the method further comprises: extracting user information and a user identifier of the to-be-identified user; comparing the user information of the to-be-identified user with user information corresponding to the user identifiers in the set of user identifiers; and adding the user identifier of the to-be-identified user to the set of user identifiers, in response to determining the user information of the to-be-identified user not matching the user information corresponding to the user identifiers in the set of user identifiers.

In some embodiments, after the adding the user identifier of the to-be-identified user to the set of user identifiers, the method further comprises: searching to-be-matched user information matching the user information of the to-be-identified user from at least one pre-acquired item of to-be-matched user information; extracting a user identifier corresponding to the to-be-matched user information searched out; and adding the extracted user identifier to the set of user identifiers.

In some embodiments, before the extracting historical published information of users indicated by user identifiers in a preset set of user identifiers, the method further comprises generating the set of user identifiers, the generating the set of user identifiers comprising: extracting a user identifier of at least one preset historical risky user, and generating the set of user identifiers; extracting one user identifier from the set of user identifiers as a target user identifier, and performing following steps of processing a user identifier: acquiring user information corresponding to the target user identifier, and determining the acquired user information as target user information; searching to-be-matched user information matching the target user information from at least one preset item of to-be-matched user information; extracting a user identifier corresponding to the to-be-matched user information searched out; and adding the extracted user identifier to the set of user identifiers.

In some embodiments, the generating the set of user identifiers further comprises: extracting a user identifier not processed by the steps of processing a user identifier from the set of user identifiers, determining the extracted user identifier not processed by the steps of processing a user identifier as the target user identifier, and continuing to perform the steps of processing a user identifier.

In a second aspect, the present disclosure provides an apparatus for identifying a risky user, comprising: a first extraction unit, configured to extract historical published information of users indicated by user identifiers in a preset set of user identifiers; and an identifying unit, configured to for each user indicated by each of the user identifiers in the set of user identifiers, perform following steps of identifying a risky user: extracting a feature vector from the historical published information of the user, inputting the extracted feature vector to a pre-trained information identifying model to obtain an information identifying result corresponding to the historical published information of the user, the information identifying model being used to characterize a corresponding relation between the feature vector and the information identifying result, and determining the user as a risky user, in response to the information identifying result corresponding to the historical published information of the user indicating the historical published information of the user as risk information.

In some embodiments, the apparatus further comprises: a generating unit, configured to use the historical published information indicated as risk information by the information identifying result as historical risk information, and generate a set of historical risk information; a receiving unit, configured to receive an information publishing request sent by a to-be-identified user, the information publishing request including to-be-published information; a first matching unit, configured to compare the to-be-published information with the historical risk information in the set of historical risk information; and a first determining unit, configured to determine the to-be-published information as risk information, and determine the to-be-identified user as a risky user, in response to the to-be-published information matching at least one item of the historical risk information.

In some embodiments, the apparatus further comprises: a second extraction unit, configured to extract a feature vector from the to-be-published information; an input unit, configured to input the extracted feature vector to the information identifying model to obtain an information identifying result corresponding to the to-be-published information; and a second determining unit, configured to determine the to-be-identified user as a risky user, in response to the information identifying result corresponding to the to-be-published information indicating the to-be-published information as risk information.

In some embodiments, the apparatus further comprises: a third determining unit, configured to determine the historical published information indicated as non-risk information by the information identifying result as historical non-risk information; and an updating unit, configured to update the information identifying model, by using the historical risk information, the historical non-risk information and the to-be-published information as training samples.

In some embodiments, the apparatus further comprises: a third extraction unit, configured to extract user information and a user identifier of the to-be-identified user; a second matching unit, configured to compare the user information of the to-be-identified user with user information corresponding to the user identifiers in the set of user identifiers; and an adding unit, configured to add the user identifier of the to-be-identified user to the set of user identifiers, in response to determining the user information of the to-be-identified user not matching the user information corresponding to the user identifiers in the set of user identifiers.

In some embodiments, the apparatus further comprises: a searching unit, configured to search to-be-matched user information matching the user information of the to-be-identified user from at least one pre-acquired item of to-be-matched user information; a fourth extraction unit, configured to extract a user identifier corresponding to the to-be-matched user information searched out; and a second adding unit, configured to add the extracted user identifier to the set of user identifiers.

In some embodiments, the apparatus further comprises: a fifth extraction unit, configured to extract a user identifier of at least one preset historical risky user, and generate the set of user identifiers; and a processing unit, configured to extract one user identifier from the set of user identifiers as a target user identifier, and perform following steps of processing a user identifier: acquiring user information corresponding to the target user identifier, and determining the acquired user information as target user information; searching to-be-matched user information matching the target user information from at least one preset item of to-be-matched user information; extracting a user identifier corresponding to the to-be-matched user information searched out; and adding the extracted user identifier to the set of user identifiers.

In some embodiments, the processing unit is further configured to: extract a user identifier not processed by the steps of processing a user identifier from the set of user identifiers, determine the extracted user identifier not processed by the steps of processing a user identifier as the target user identifier, and continue to perform the steps of processing a user identifier.

For each user indicated by each of the user identifiers in the set of user identifiers, by extracting a feature vector from the extracted historical published information of the user, then inputting the feature vector to an information identifying model to obtain an information identifying result, and finally determining the user as a risky user, in response to the information identifying result indicating the historical published information of the user as risk information, the method and apparatus for identifying a risky user and a server provided by the present disclosure realizes the identifying a risky user based on the information published by the user, and improves the accuracy of the identifying a risky user.

BRIEF DESCRIPTION OF THE DRAWINGS

After reading detailed descriptions of non-limiting embodiments with reference to the following accompanying drawings, other features, objectives and advantages of the present disclosure will be more apparent.

DETAILED DESCRIPTION OF EMBODIMENTS

The present application will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
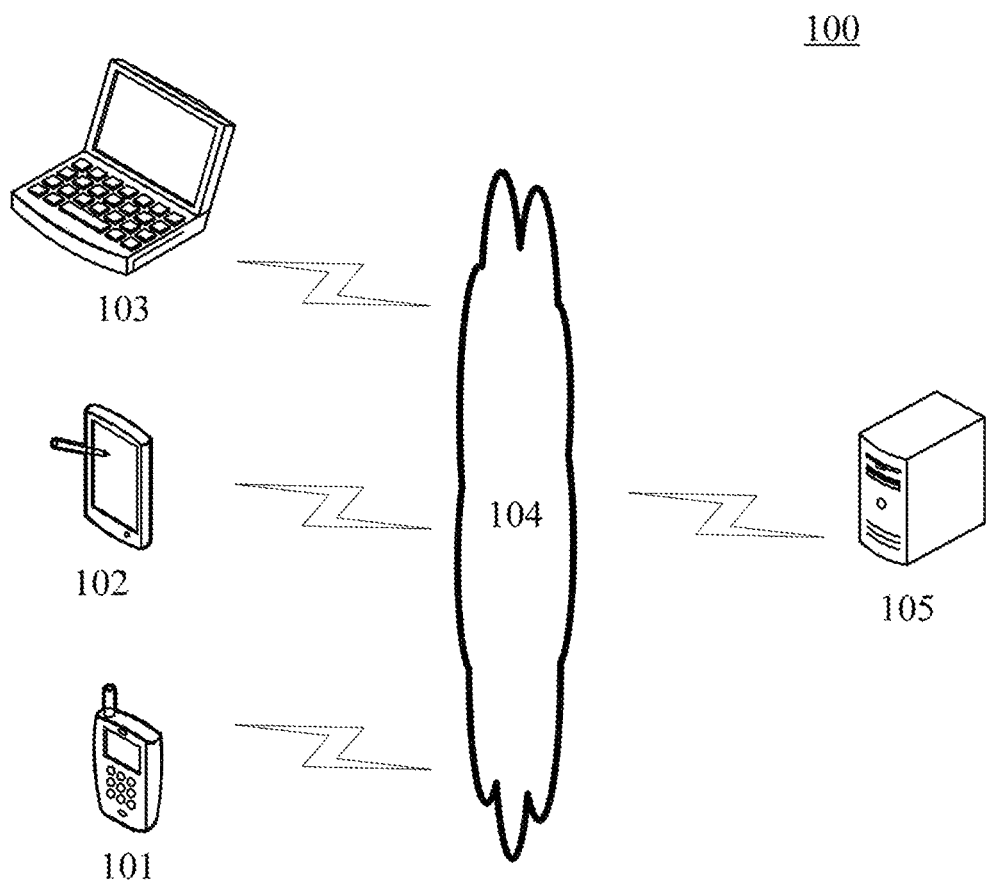
FIG. 1 is an exemplary system architecture diagram in which the present disclosure may be applied.

FIG. 1 shows an exemplary architecture of a system 100 which may be used by a method or apparatus for identifying a risky user according to the embodiments of the present application.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user may use the terminal devices 101, 102 and 103 to interact with the server 105 through the network 104, in order to transmit or receive messages, etc. Various communication client applications, such as text editing applications, social applications, debiting applications, webpage browser applications, shopping applications, search applications, instant messaging tools, mailbox clients, and social platform software may be installed on the terminal devices 101, 102 and 103.

The terminal devices 101, 102 and 103 may be various electronic devices capable of publishing information, including but not limited to, smart phones, tablet computers, e-book readers, MP3 (Moving Picture Experts Group Audio Layer III) players, MP4 (Moving Picture Experts Group Audio Layer IV) players, laptop computers and desktop computers.

The server 105 may be a server providing various services, for example, a back-stage management server supporting the publishing information sent from the terminal devices 101, 102 or 103. The back-stage management server may perform a corresponding processing on data such as the received publishing information, and determine whether the user publishing the publishing information is a risky user.

It should be noted that the method for identifying a risky user according to the embodiments of the present application is generally executed by the server 105. Accordingly, the apparatus for identifying a risky user is generally installed on the server 105.

It should be appreciated that the numbers of the terminal devices, the networks and the servers in FIG. 1 are merely illustrative. Any number of terminal devices, networks and servers may be provided based on the actual requirements.

Figure 2:
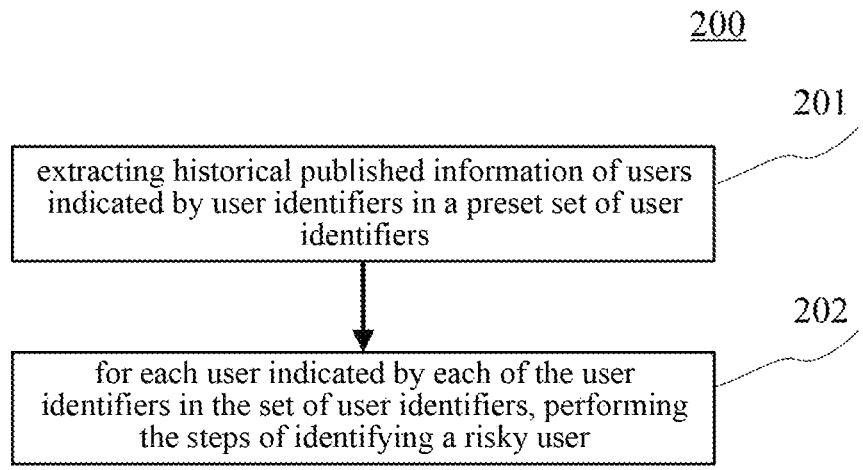
FIG. 2 is a flowchart of an embodiment of a method for identifying a risky user according to the present disclosure.

With further reference to FIG. 2, a flow 200 of an embodiment of the method for identifying a risky user according to the present disclosure is shown. The method for identifying a risky user includes the following steps:

Step 201, extracting historical published information of users indicated by user identifiers in a preset set of user identifiers.

In the present embodiment, a set of user identifiers may be preset in an electronic device (e.g., the server as illustrated in FIG. 1) on which the method for identifying a risky user operate, and the set of user identifiers may store at least one user identifier. The electronic device may extract, from the local or another server (not shown in FIG. 1) connected to the electronic device by means of wired connection or wireless connection, historical published information of users indicated by user identifiers in a preset set of user identifiers. Here, the user identifier may be a character string consisting of various characters (e.g., letters, numbers, symbols, etc.) for indicating and uniquely determining the user. It should be noted that for each user indicated by each of the user identifiers in the set of user identifiers, the historical published information of the user may be all the text information published by the user on a preset website or platform, or may be the text information published by the user on the preset website or platform in a preset time period (e.g., the last week, the last day, etc.), also may be the latest preset number (e.g., 1, 3, 5, etc.) of text information published and sent by the user recently on the preset website or platform. In practice, the text information may be uploaded to the electronic device through terminals (e.g., the terminal devices 101, 102 and 103 shown in FIG. 1). It should be noted that the wireless connection may include, but is not limited to, 3G/4G connection, WiFi connection, bluetooth connection, WiMAX connection, Zigbee connection, UWB (ultra wideband) connection, and other wireless connections known by now or to be developed in the future.

Step 202, for each user indicated by each of the user identifiers in the set of user identifiers, performing the steps of identifying a risky user.

Figure 3:
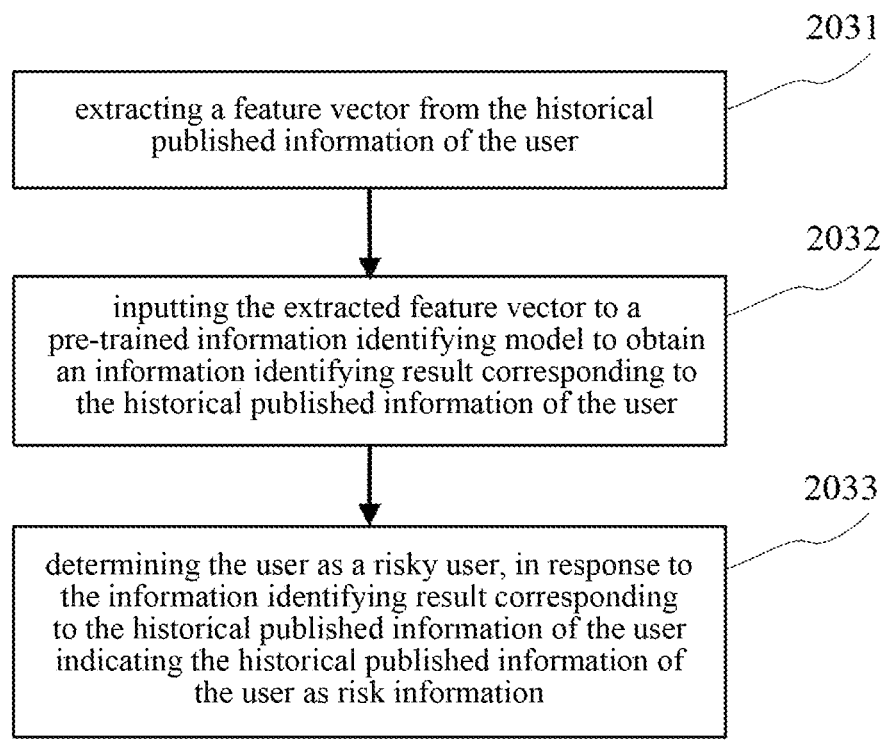
FIG. 3 is an exploded flowchart of the steps of identifying a risky user in the flowchart of FIG. 2.

In the present embodiment, with further reference to FIG. 3, is an exploded flowchart of the steps of identifying a risky user in the step 202. In FIG. 3, for each user indicated by each of the user identifiers in the set of user identifiers, the above steps of identifying a risky user is exploded into the following three sub-steps, namely, step 2031, step 2032 and step 2033.

Step 2031, extracting a feature vector from the historical published information of the user.

In the present embodiment, for each user indicated by each of the user identifiers in the set of user identifiers, the electronic device may first perform feature extraction to the historical published information of the user to obtain a plurality of feature words, and then generate a feature vector based on the plurality of feature words. It should be noted that the feature words may include, but are not limited to characters, words, phrases, etc. The feature vector may be a vector composed of the plurality of feature words, or may be a vector composed of a numerical value generated by processing (e.g., word frequency calculation, document frequency calculation, data type conversion, scaling, etc.) the feature words.

It should be noted that the historical published information may be a plurality of text information, and the feature vector may be a feature vector extracted from the plurality of items of the text information, or may be a plurality of feature vectors extracted from the plurality of items of the text information. Each feature vector corresponds to an item of the text information.

In some alternative implementations of the present embodiment, for each user indicated by each of the user identifiers in the set of user identifiers, the electronic device may first divide the historical published information of the user into words utilizing various word segmentation methods, and then extract feature words from the words obtained from the segmentation. The word segmentation methods may be word segmentation methods based on statistics. Specifically, the frequency of the combinations of adjacent characters in the historical published information may be counted to calculate the frequency of the combinations of characters. When the probability is higher than a preset probability threshold, it is determined that the combination constitutes a word, thereby realizing a word segmentation of the historical published information. In addition, the word segmentation methods may also be word segmentation methods based on the string matching principle, and may match the to-be-analyzed segment and the string preset in the machine dictionary of the electronic device utilizing the string matching principle. Here, the string matching principle may be the forward maximum matching method, the reverse maximum matching method, the establishing segmentation marking method, the word-by-word matching method, the forward best matching method, the reverse best matching method, etc.

In some alternative implementations of the present embodiment, the electronic device may prestore a set of feature words, wherein the set of feature words includes a plurality of feature words. The electronic device extracts the feature words from the words obtained from the segmentation, and may perform according to the following steps: first, extracting the set of feature words; then string matching the words obtained from the segmentation with the feature words in the set of feature words; and finally extracting the matched words as feature words.

In some alternative implementations of the present embodiment, the electronic device extracts the feature words from the words obtained from the segmentation, and may perform according to the following steps: first, performing importance calculation to the words obtained from the segmentation (e.g., adopting the TF-IDF (Term Frequency-Inverse Document Frequency) method), then obtaining keywords based on the result of the importance calculation, and determining the obtained keywords as the feature words.

In some alternative implementations of the present embodiment, the electronic device may determine each of the words obtained from the segmentation as a feature word and generate a plurality of feature words, then constitute the feature vector with the plurality of feature words.

It should be noted that the word segmentation methods, the feature vector generating method, the importance calculation method and the string matching principle are well-known technologies that have been widely studied and applied by far, and detailed description thereof will be omitted.

Step 2032, inputting the extracted feature vector to a pre-trained information identifying model to obtain an information identifying result corresponding to the historical published information of the user.

In the present embodiment, the electronic device may input the feature vector extracted in step 2031 to a pre-trained information identifying model to obtain an information identifying result corresponding to the historical published information of the user. Here, the information identifying model may be used to characterize a corresponding relation between the feature vector and the information identifying result.

In the present embodiment, the information identifying model may be generated in advance by the following steps: first, acquiring training samples; next, extracting a feature vector from each of the training samples; then, training to obtain the information identifying model, utilizing a machine learning method, with the feature vector extracted from each of the training samples as an input, and the category of the training sample (e.g., risk information, non-risk information) as an output. It should be noted that the feature vector extracted from each of the training samples may be one or more. In practice, the electronic device may establish the information identifying model based on various algorithms. For example, the algorithm may be the naive Bayesian algorithm, the support vector machine, etc. It should be noted that the Naive Bayesian algorithm is a classification method based on the Bayesian theorem and the characteristics conditional independence assumption. The support vector machine is a supervised learning model related to learning algorithm, which may analyze data and identify patterns, and may be used for classification and regression analysis.

It should be noted that the Naive Bayesian algorithm and the support vector machine are well-known technologies that have been widely studied and applied by far, and detailed description thereof will be omitted.

Step 2033, determining the user as a risky user, in response to the information identifying result corresponding to the historical published information of the user indicating the historical published information of the user as risk information.

In the present embodiment, in response to the information identifying result corresponding to the historical published information of the user obtained in step 2032 indicating the historical published information of the user as risk information, the electronic device may determine the user as a risky user.

In some alternative implementations of the present embodiment, the electronic device may also determine the users in the set of user identifiers, other than the users indicated by the user identifiers as risky users, as potential risky users.

Figure 4:
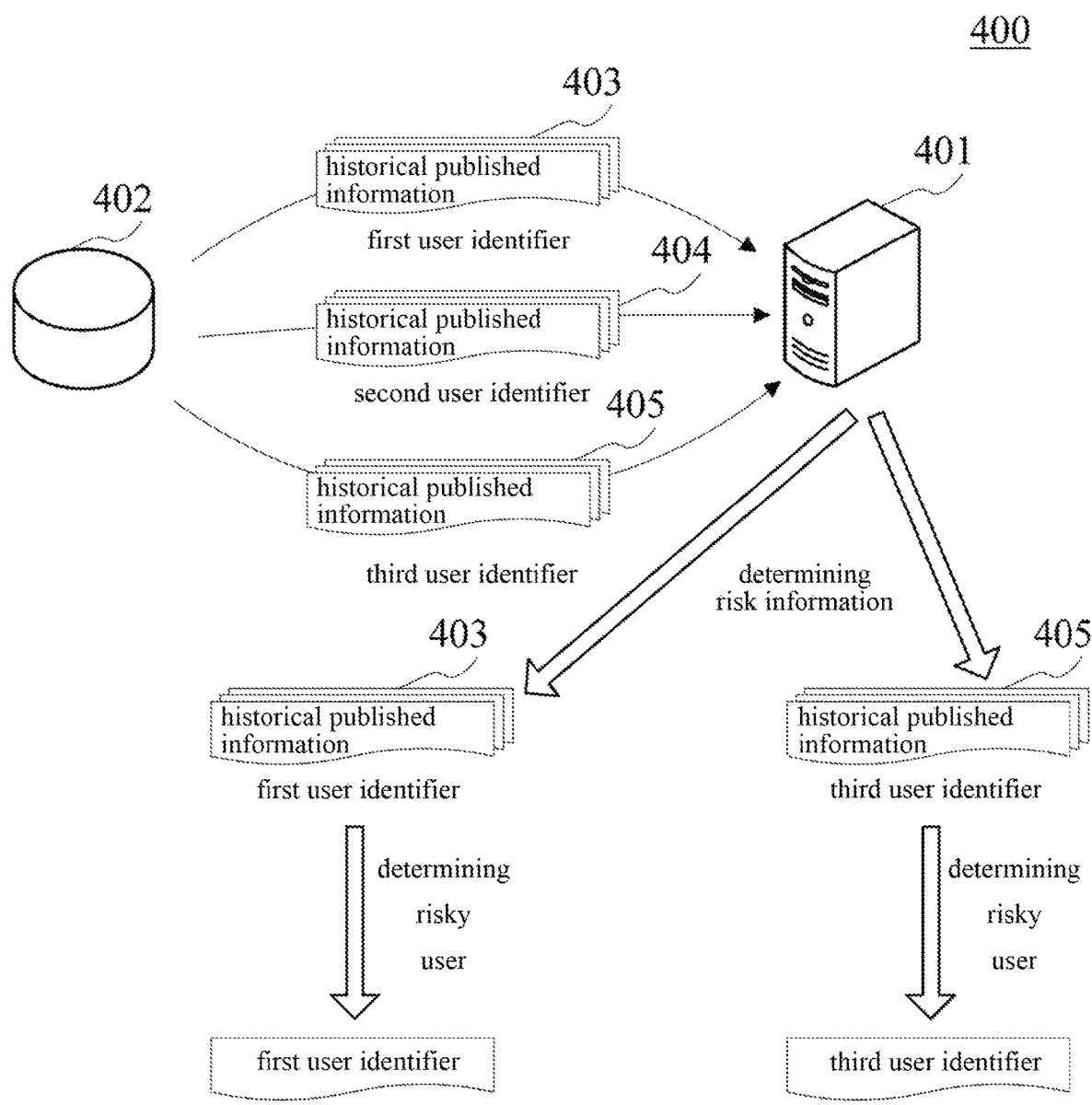
FIG. 4 is a schematic diagram of an application scenario of the method for identifying a risky user according to the present disclosure.

With further reference to FIG. 4, FIG. 4 is a schematic diagram of an application scenario of the method for identifying a risky user according to the present embodiment. In the application scenario of FIG. 4, the backend management server 401 first extracts, from the database 402, the historical published information 403 of the user, the historical published information 404 of the user and the historical published information 405 of the user indicated respectively by the first user identifier, the second user identifier and the third user identifier in the preset set of user identifiers. Then, the backend management server 401 extracts feature vectors from the historical published information 403, the historical published information 404 and the historical published information 405 respectively, and inputs the extracted feature vectors to a pre-trained information identifying model to obtain information identifying results respectively corresponding to the historical published information 403, the historical published information 404 and the historical published information 405. Based on the information identifying results, the historical published information 403 and the historical published information 405 corresponding to the information identifying results are identified as risk information, thus the electronic device determines users indicated by the first user identifier and the third user identifier as risky users.

For each user indicated by each of the user identifiers in the set of user identifiers, by extracting a feature vector from the extracted historical published information of the user, then inputting the feature vector to an information identifying model to obtain an information identifying result, and finally determining the user as a risky user, in response to the information identifying result indicating the historical published information of the user as risk information, the method provided by the above embodiments of the present disclosure realizes the identifying a risky user based on the information published by the user, and improves the accuracy of the identifying a risky user.

Figure 5:
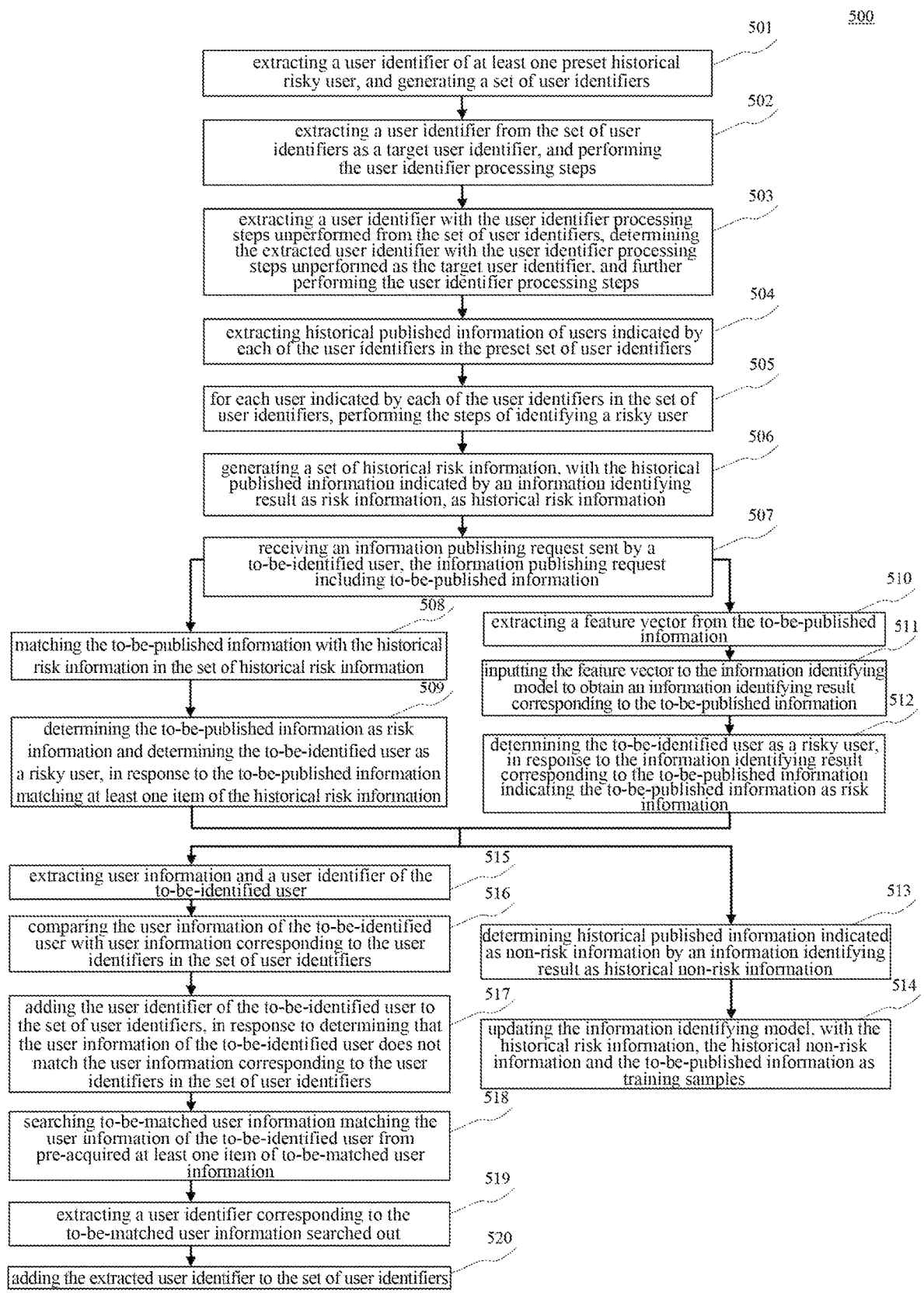
FIG. 5 is a flowchart of another embodiment of the method for identifying a risky user according to the present disclosure.

With further reference to FIG. 5, a flow 500 of another embodiment of the method for identifying a risky user is shown. The flow 500 of the method for identifying a risky user includes the following steps:

Step 501, extracting a user identifier of at least one preset historical risky user, and generating a set of user identifiers.

In the present embodiment, historical data may be pre-stored in an electronic device (e.g., the server as illustrated in FIG. 1) on which the method for identifying a risky user operate, and the historical data may include information such as user identifiers of a plurality of historical risky users. The electronic device may extract a user identifier of at least one historical risky user from the historical data, and generate a set of user identifiers.

Step 502, extracting a user identifier from the set of user identifiers as a target user identifier, and performing the user identifier processing steps.

In the present embodiment, the electronic device may extract a user identifier from the set of user identifiers generated in step 501 as a target user identifier, and performing the following user identifier processing steps:

The first step, acquiring user information corresponding to the target user identifier, and determining the acquired user information as target user information. Here, the user information may include the user's personal information, qualification information, etc. For example, the user information may include, but is not limited to the user's real name, identity number, address, URL of the managed website, bank card number, landline number, mobile phone number, e-mail address, username, nickname, password or questions to recover password, social platform account, payment platform account, enterprise qualification information, corporate name, etc. It should be noted that the electronic device may prestore the user information of the user indicated by each of the managed user identifiers.

The second step, searching to-be-matched user information matching the target user information from at least one preset item of the to-be-matched user information. Here, the at least one preset item of the to-be-matched user information may be user information of the users indicated by the rest of the user identifiers other than the user identifiers in the set of user identifiers, in the user identifiers managed by the electronic device. The electronic device may search the to-be-matched user information matching the target user information from the at least one item of the to-be-matched user information according to a preset arbitrary searching method. For example, the electronic device may search an item (such as an ID number) in the user information, or may search a plurality of items (such as an ID number and a mobile phone number) in the user information, and may sequentially search each item in the user information.

The third step, extracting a user identifier corresponding to the to-be-matched user information searched out. Specifically, the electronic device may first determine a user identifier of the user corresponding to the to-be-matched user information searched out, then extract the determined user identifier.

The fourth step, adding the extracted user identifier to the set of user identifiers.

Step 503, extracting a user identifier not processed by the steps of processing a user identifier from the set of user identifiers, determining the extracted user identifier not processed by the steps of processing a user identifier as the target user identifier, and further performing the user identifier processing steps.

In the present embodiment, the electronic device may extract a user identifier not processed by the steps of processing a user identifier from the set of user identifiers, determine the extracted user identifier not processed by the steps of processing a user identifier as the target user identifier, and perform the user identifier processing steps again.

Step 504, extracting historical published information of users indicated by each of the user identifiers in the preset set of user identifiers.

In the present embodiment, the electronic device may determine the set of user identifiers with the step 503 been performed on as the preset set of user identifiers, and extract historical published information of each user indicated by each of the user identifiers in the set of user identifiers.

Step 505, for each user indicated by each of the user identifiers in the set of user identifiers, performing the steps of identifying a risky user.

In the present embodiment, for each user indicated by each of the user identifiers in the set of user identifiers, the electronic device may perform the following steps of identifying a risky user: first, the electronic device may extract a feature vector from the historical published information of the user, and input the extracted feature vector to a pre-trained information identifying model to obtain an information identifying result corresponding to the historical published information of the user, the information identifying model being used to characterize a corresponding relation between the feature vector and the information identifying result. Then, the electronic device may determine the user as a risky user, in response to the information identifying result corresponding to the historical published information of the user indicating the historical published information of the user as risk information.

It should be noted that the specific operations of the steps 504-505 are substantially the same to those of the steps 201-202, and detailed description thereof is omitted.

Step 506, generating a set of historical risk information, with the historical published information indicated by an information identifying result as risk information, as historical risk information.

In the present embodiment, the electronic device may first determine historical published information indicated by the information identifying result as risk information in the historical published information processed in step 505 as historical risk information, and generate a set of historical risk information.

Step 507, receiving an information publishing request sent by a to-be-identified user.

In the present embodiment, the electronic device may receive an information publishing request sent by a to-be-identified user from a terminal (e.g., the terminal devices 101, 102 and 103 shown in FIG. 1) by means of wired connection or wireless connection. Here, the information publishing request includes to-be-published information. It should be noted that the to-be-published information may be any text information published by the to-be-identified user on a preset website or platform, such as advertising text information and production introduction information. The to-be-identified user may be a user indicated by a user identifier managed by the electronic device. Typically, the to-be-published request may also include the user identifier of the to-be-identified user, and the electronic device may determine the user who has sent the to-be-published request as the to-be-identified user.

The electronic device may identify the to-be-published information utilizing various methods, after receiving the information publishing request, such as identifying by comparing the to-be-published information with each item of the historical risk information, in this case, the steps 508-509 may be performed. The to-be-published information may also be identified by utilizing the information identifying model, in this case, the steps 510-512 may be performed.

Step 508, comparing the to-be-published information with each item of the historical risk information in the set of historical risk information.

In the present embodiment, the electronic device may compare the to-be-published information with each item of the historical risk information in the set of historical risk information generated in step 506 utilizing various string matching algorithms. It should be noted that the electronic device may also compare the to-be-published information with each item of the historical risk information by utilizing various similarity calculation methods (e.g., the cosine similarity algorithm, the matrix similarity algorithm, etc.), and determine that the to-be-published information matches the historical risk information, when the similarity of the to-be-published information and a certain item of the historical risk information is greater than a preset similarity threshold.

Step 509, determining the to-be-published information as risk information and determining the to-be-identified user as a risky user, in response to the to-be-published information matching at least one item of the historical risk information.

In the present embodiment, the electronic device may determine the to-be-published information as risk information and determine the to-be-identified user as a risky user, in response to the to-be-published information matching at least one item of the historical risk information in the set of historical risk information, that is, there is historical risk information matching the to-be-published information in the set of historical risk information. After determining the to-be-identified user as the risky user, the electronic device may perform the steps 513 and 515.

Step 510, extracting a feature vector from the to-be-published information.

In the present embodiment, the electronic device may extract a feature vector from the to-be-published information, after receiving the information publishing request sent by the to-be-identified user in step 507. Here, the specific operation of extracting the feature vector from the to-be-published information is substantially the same to the specific operation of extracting the feature vector from the historical published information in step 2021 and step 505, thus detailed description thereof is omitted.

Step 511, inputting the feature vector to the information identifying model to obtain an information identifying result corresponding to the to-be-published information.

In the present embodiment, the electronic device may input the feature vector extracted in step 510 to the information identifying model to obtain an information identifying result corresponding to the to-be-published information. Here, the specific operation of inputting the feature vector extracted from the to-be-published information to the information identifying model is substantially the same to the specific operation of inputting the feature vector extracted from the historical published information to the information identifying model in step 2022 and step 505, thus detailed description thereof is omitted.

Step 512, determining the to-be-identified user as a risky user, in response to the information identifying result corresponding to the to-be-published information indicating the to-be-published information as risk information.

In the present embodiment, the electronic device may determine the to-be-identified user as a risky user, in response to the information identifying result corresponding to the to-be-published information indicating the to-be-published information as risk information. Then, the electronic device may perform the steps 513 and 515.

Step 513, determining historical published information indicated as non-risk information by an information identifying result as historical non-risk information.

In the present embodiment, the electronic device may determine historical published information indicated as non-risk information by an information identifying result in the historical published information processed in step 505 as historical non-risk information.

Step 514, updating the information identifying model, with the historical risk information, the historical non-risk information and the to-be-published information as training samples.

In the present embodiment, the electronic device may update the information identifying model, with the historical risk information determined in step 506, the historical non-risk information determined in step 513 and the to-be-published information as training samples.

It should be noted that the electronic device may receive a plurality of items of the to-be-published information. The electronic device may, after determining each item of the to-be-published information as a risk information, update the information identifying model each time, or may update the information identifying model periodically. In addition, the electronic device may also trigger an update manually, after finding an output error from the information identifying model through a manual review.

Step 515, extracting user information and a user identifier of the to-be-identified user.

In the present embodiment, the electronic device may prestore the user information of each of the users managed. The electronic device may extract user information and a user identifier of the to-be-identified user, after determining the to-be-identified user as a risky user in step 509 or step 512.

Step 516, comparing the user information of the to-be-identified user with user information corresponding to the user identifiers in the set of user identifiers.

In the present embodiment, the electronic device may compare the user information of the to-be-identified user with user information corresponding to the user identifiers in the set of user identifiers. It should be noted that the electronic device may compare by utilizing various methods. For example, the electronic device may compare an item (such as an ID number) in the user information, and if the item is successfully matched, it may be regarded as the user information is matched. The electronic device may also compare a plurality of items (such as an ID number and a mobile phone number) in the user information, and if the plurality of items are all successfully matched, it may be regarded as the user information is matched. The electronic device may also sequentially compare each of the items in the user information, and if the items are all successfully matched, it may be regarded as the user information is matched.

Step 517, adding the user identifier of the to-be-identified user to the set of user identifiers, in response to determining that the user information of the to-be-identified user does not match the user information corresponding to the user identifiers in the set of user identifiers.

In the present embodiment, the electronic device may add the user identifier of the to-be-identified user to the set of user identifiers, in response to determining that the user information of the to-be-identified user does not match the user information corresponding to the user identifiers in the set of user identifiers in step 516.

Step 518, searching to-be-matched user information matching the user information of the to-be-identified user from pre-acquired at least one item of to-be-matched user information.

In the present embodiment, the electronic device may search to-be-matched user information matching the user information of the to-be-identified user from the at least one item of to-be-matched user information acquired in step 502.

Step 519, extracting a user identifier corresponding to the to-be-matched user information searched out.

In the present embodiment, the electronic device may extract a user identifier corresponding to the to-be-matched user information searched out in step 518.

Step 520, adding the extracted user identifier to the set of user identifiers.

In the present embodiment, the electronic device may add the user identifier extracted in step 519 to the set of user identifiers. It should be noted that the electronic device may also perform the step 505 again based on the updated information identifying model and the current set of user identifiers, after adding the extracted user identifier to the set of user identifiers.

As can be seen from FIG. 5, compared to the corresponding embodiment in FIG. 2, the flow 500 of the method for identifying a risky user in the present embodiment highlights the step of generating and extending the set of user identifiers, the step of determining whether the to-be-identified user is a risky user, and the step of updating the information identifying model. Thus, the solution described by the present embodiment realizes not only the identifying a risky user based on the information published by the user, but also the automatic update of the information identifying model, improves the timeliness and the competitiveness of the information identifying model, and further improves the accuracy of the identifying a risky user.

Figure 6:
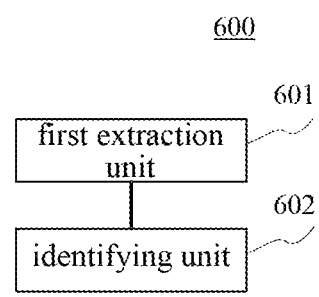
FIG. 6 is a schematic structural diagram of an embodiment of an apparatus for identifying a risky user according to the present disclosure.

With further reference to FIG. 6, as an implementation to the method illustrated in the above figures, the present disclosure provides an embodiment of an apparatus for identifying a risky user. The apparatus embodiment corresponds to the method embodiment shown in FIG. 2, and the apparatus may be specifically applied to various electronic devices.

As shown in FIG. 6, the apparatus 600 for identifying a risky user of the present embodiment includes: a first extraction unit 601, configured to extract historical published information of users indicated by user identifiers in a preset set of user identifiers; an identifying unit 602, configured to for each user indicated by each of the user identifiers in the set of user identifiers, perform the following steps of identifying a risky user: extracting a feature vector from the historical published information of the user, and inputting the extracted feature vector to a pre-trained information identifying model to obtain an information identifying result corresponding to the historical published information of the user, the information identifying model being used to characterize a corresponding relation between the feature vector and the information identifying result; and determining the user as a risky user, in response to the information identifying result corresponding to the historical published information of the user indicating the historical published information of the user as risk information.

In some alternative implementations of the present embodiment, the apparatus 600 for identifying a risky user may further include a fifth extraction unit and a processing unit (not shown in the figure). The fifth extraction unit may be configured to extract a user identifier of at least one preset historical risky user, and generate a set of user identifiers. The processing unit may be configured to extract a user identifier from the set of user identifiers as a target user identifier, and perform the following user identifier processing steps: acquiring user information corresponding to the target user identifier, and determining the acquired user information as target user information; searching to-be-matched user information matching the target user information from at least one preset item of to-be-matched user information; extracting a user identifier corresponding to the to-be-matched user information searched out; and adding the extracted user identifier to the set of user identifiers.

In some alternative implementations of the present embodiment, the processing unit may be further configured to: extract a user identifier not processed by the steps of processing a user identifier from the set of user identifiers, determine the extracted user identifier not processed by the steps of processing a user identifier as the target user identifier, and further perform the user identifier processing steps.

In the present embodiment, the first extraction unit 601 may determine the set of user identifiers as the preset set of user identifiers, and extract the historical published information of each user indicated by each of the user identifiers in the set of user identifiers.

In the present embodiment, for each user indicated by each of the user identifiers in the set of user identifiers, the identifying unit 602 may perform the following steps of identifying a risky user: first, the identifying unit 602 may extract a feature vector from the historical published information of the user, and input the extracted feature vector to a pre-trained information identifying model to obtain an information identifying result corresponding to the historical published information of the user, the information identifying model being used to characterize a corresponding relation between the feature vector and the information identifying result. Then, the identifying unit 602 may determine the user as a risky user, in response to the information identifying result corresponding to the historical published information of the user indicating the historical published information of the user as risk information.

In some alternative implementations of the present embodiment, the apparatus 600 for identifying a risky user may further include a generating unit, a receiving unit, a first matching unit and a first determining unit (not shown in the figure). The generating unit may be configured to generate a set of historical risk information, with the historical published information indicated by an information identifying result as risk information, as historical risk information. The receiving unit may be configured to receive an information publishing request sent by a to-be-identified user, the information publishing request including to-be-published information. The first matching unit may be configured to compare the to-be-published information with the historical risk information in the set of historical risk information. The first determining unit may be configured to determine the to-be-published information as risk information and determine the to-be-identified user as a risky user, in response to the to-be-published information matching at least one item of the historical risk information.

In some alternative implementations of the present embodiment, the apparatus 600 for identifying a risky user may further include a second extraction unit, an input unit and a second determining unit (not shown in the figure). The second extraction unit may be configured to extract a feature vector from the to-be-published information. The input unit may be configured to input the extracted feature vector to the information identifying model to obtain an information identifying result corresponding to the to-be-published information. The second determining unit may be configured to determine the to-be-identified user as a risky user, in response to the information identifying result corresponding to the to-be-published information indicating the to-be-published information as risk information.

In some alternative implementations of the present embodiment, the apparatus 600 for identifying a risky user may further include a third determining unit and an updating unit (not shown in the figure). The third determining unit may be configured to determine historical published information indicated as non-risk information by an information identifying result as historical non-risk information. The updating unit may be configured to update the information identifying model, with the historical risk information, the historical non-risk information and the to-be-published information as training samples.

In some alternative implementations of the present embodiment, the apparatus 600 for identifying a risky user may further include a third extraction unit, a second matching unit and an adding unit (not shown in the figure). The third extraction unit may be configured to extract user information and a user identifier of the to-be-identified user. The second matching unit may be configured to compare the user information of the to-be-identified user with user information corresponding to the user identifiers in the set of user identifiers. The adding unit may be configured to add the user identifier of the to-be-identified user to the set of user identifiers, in response to determining that the user information of the to-be-identified user does not match the user information corresponding to the user identifiers in the set of user identifiers.

In some alternative implementations of the present embodiment, the apparatus 600 for identifying a risky user may further include a searching unit, a fourth extraction unit and a second adding unit (not shown in the figure). The searching unit may be configured to search to-be-matched user information matching the user information of the to-be-identified user from pre-acquired at least one item of to-be-matched user information. The fourth extraction unit may be configured to extract a user identifier corresponding to the to-be-matched user information searched out. The second adding unit may be configured to add the extracted user identifier to the set of user identifiers.

For each user indicated by each of the user identifiers in the set of user identifiers, by extracting a feature vector by the identifying unit 602 from the historical published information of the user extracted by the first extraction unit 601, then inputting the feature vector to an information identifying model to obtain an information identifying result, and finally determining the user as a risky user, in response to the information identifying result indicating the historical published information of the user as risk information, the apparatus provided by the embodiment of the present disclosure realizes the identifying a risky user based on the information published by the user, and improves the accuracy of the identifying a risky user.

Figure 7:
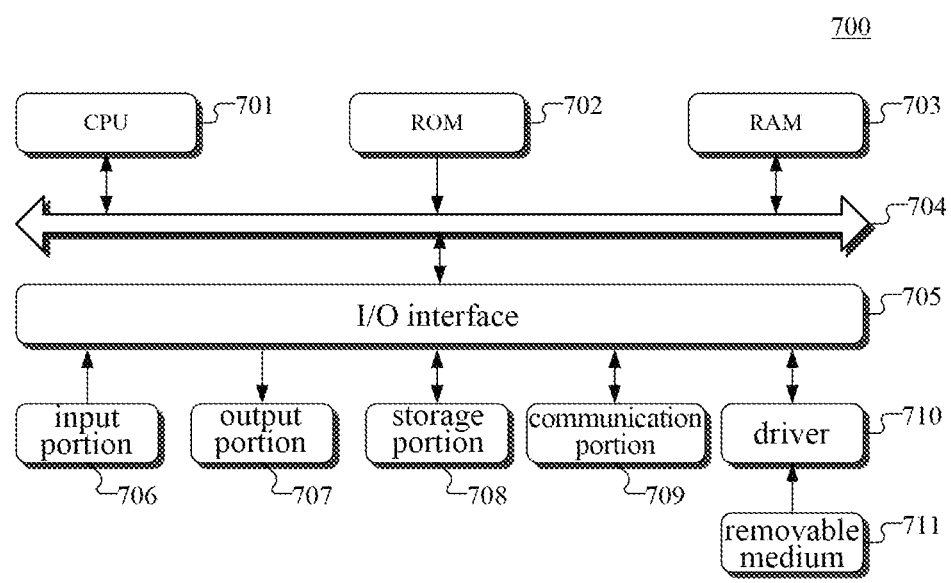
FIG. 7 is a schematic structural diagram of a computer system adapted to implement a server of embodiments of the present disclosure.

With reference to FIG. 7, a schematic structural diagram of a computer system 700 adapted to implement a server of the embodiments of the present disclosure is illustrated. The terminal device/server shown in FIG. 7 is merely an example and should not impose any restriction on the functions and the scope of use of the embodiments of the present disclosure.

As shown in FIG. 7, the computer system 700 includes a central processing unit (CPU) 701, which may execute various appropriate actions and processes in accordance with a program stored in a read-only memory (ROM) 702 or a program loaded into a random access memory (RAM) 703 from a storage portion 708. The RAM 703 also stores various programs and data required by operations of the system 700. The CPU 701, the ROM 702 and the RAM 703 are connected to each other through a bus 704. An input/output (I/O) interface 705 is also connected to the bus 704.

The following components are connected to the I/O interface 705: an input portion 706 including a keyboard, a mouse etc.; an output portion 707 comprising a cathode ray tube (CRT), a liquid crystal display device (LCD), a speaker etc.; a storage portion 708 including a hard disk and the like; and a communication portion 709 comprising a network interface card, such as a LAN card and a modem. The communication portion 709 performs communication processes via a network, such as the Internet. A driver 710 is also connected to the I/O interface 705 as required. A removable medium 711, such as a magnetic disk, an optical disk, a magneto-optical disk, and a semiconductor memory, may be installed on the driver 710, to facilitate the retrieval of a computer program from the removable medium 711, and the installation thereof on the storage portion 708 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 709, and/or may be installed from the removable media 711. The computer program, when executed by the CPU 701, implements the functions as defined by the methods of the present disclosure.

It is to be noted that the computer readable medium in the present application may be computer readable signal medium or computer readable storage medium or the combination thereof. An example of the computer readable storage medium may include but not limited to: systems, devices or elements of electric, magnet, light, electromagnet, infrared ray, or semiconductor or the combination thereof. A more specific example of the computer readable storage medium may include but not limited to: electrical connections with one or more wire, portable computer disk, hard disk, random access memory (RAM), read only memory (ROM), erasable programmable read only memory (EPROM or flash memory), fibre, portable compact disk read only memory (CD-ROM), optical memory, magnet memory or the combination thereof. In the present application, the computer readable storage medium may be any physical medium containing or storing programs which can be used by a command execution system, a device or an elements or the incorporation thereof. In the present application, the computer readable signal medium may include data signal in the base band or propagating as parts of a carrier in which computer readable program codes are carried. A form of the propagated signal may include but not limited to: electromagnetic signal, optical signal or the combination thereof. The signal medium that can be read by computer may be any computer readable medium except for computer readable storage medium. The computer readable medium is capable of emitting, propagating or transmitting programs for an instruction execution system, a device or an element or the combination thereof. The program codes on the computer readable medium may be transported with any suitable medium including but not limited to: a wireless medium, a wire medium, an optical cable medium, a RF medium or any combination thereof.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present application may be implemented by means of software or hardware. The described units or modules may also be provided in a processor, for example, described as: a processor, comprising an first extraction unit and an identifying unit, where the names of these units or modules do not in some cases constitute a limitation to such units or modules themselves. For example, the first extraction unit may also be described as "a unit for extracting historical published information of users indicated by user identifiers in a preset set of user identifiers."

In another aspect, the present application further provides a computer-readable storage medium. The computer-readable storage medium may be the computer storage medium included in the apparatus in the above described embodiments, or a stand-alone computer-readable storage medium not assembled into the apparatus. The computer-readable storage medium stores one or more programs. The one or more programs, when executed by a device, cause the device to: extract historical published information of users indicated by user identifiers in a preset set of user identifiers; and for each user indicated by each of the user identifiers in the set of user identifiers, perform following steps of identifying a risky user: extracting a feature vector from the historical published information of the user, inputting the extracted feature vector to a pre-trained information identifying model to obtain an information identifying result corresponding to the historical published information of the user, the information identifying model being used to characterize a corresponding relation between the feature vector and the information identifying result, and determining the user as a risky user, in response to the information identifying result corresponding to the historical published information of the user indicating the historical published information of the user as risk information.

The above description only provides an explanation of the preferred embodiments of the present application and the technical principles used. It should be appreciated by those skilled in the art that the inventive scope of the present application is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present application are examples.

What is claimed is:

1. A method for identifying a risky user, comprising:
   extracting historical published information of users indicated by user identifiers in a preset set of user identifiers; and
   for each user indicated by each of the user identifiers in the set of user identifiers, performing following steps of identifying a risky user: extracting a feature vector from the historical published information of the user, inputting the extracted feature vector to a pre-trained information identifying model to obtain an information identifying result corresponding to the historical published information of the user, the information identifying model being used to characterize a corresponding relation between the feature vector and the information identifying result, and determining the user as a risky user, in response to the information identifying result corresponding to the historical published information of the user indicating the historical published information of the user as risk information;
   wherein the method further comprises:
   using the historical published information indicated as risk information by the information identifying result as historical risk information, and generating a set of historical risk information;
   receiving an information publishing request sent by a to-be-identified user, the information publishing request including to-be-published information;
   comparing the to-be-published information with the historical risk information in the set of historical risk information; and
   determining the to-be-published information as risk information, and determining the to-be-identified user as a risky user, in response to the to-be-published information matching at least one item of the historical risk information; and
   wherein after the determining the to-be-identified user as a risky user, the method further comprises:
   determining the historical published information indicated as non-risk information by the information identifying result as historical non-risk information; and
   updating the information identifying model, by using the historical risk information, the historical non-risk information and the to-be-published information as training samples.

2. The method according to claim 1, wherein after the receiving an information publishing request sent by a to-be-identified user, the method further comprises:

extracting a feature vector from the to-be-published information;

inputting the extracted feature vector to the information identifying model to obtain an information identifying result corresponding to the to-be-published information; and determining the to-be-identified user as a risky user, in response to the information identifying result corresponding to the to-be-published information indicating the to-be-published information as risk information.

3. The method according to claim 1, wherein after the determining the to-be-identified user as a risky user, the method further comprises:

extracting user information and a user identifier of the to-be-identified user;

comparing the user information of the to-be-identified user with user information corresponding to the user identifiers in the set of user identifiers; and adding the user identifier of the to-be-identified user to the set of user identifiers, in response to determining the user information of the to-be-identified user not matching the user information corresponding to the user identifiers in the set of user identifiers.

4. The method according to claim 3, wherein after the adding the user identifier of the to-be-identified user to the set of user identifiers, the method further comprises:

searching to-be-matched user information matching the user information of the to-be-identified user from at least one pre-acquired item of to-be-matched user information;

extracting a user identifier corresponding to the to-be-matched user information searched out; and adding the extracted user identifier to the set of user identifiers.

5. The method according to claim 1, wherein before the extracting historical published information of users indicated by user identifiers in a preset set of user identifiers, the method further comprises generating the set of user identifiers, the generating the set of user identifiers comprising:

extracting a user identifier of at least one preset historical risky user, and generating the set of user identifiers;

extracting one user identifier from the set of user identifiers as a target user identifier, and performing following steps of processing a user identifier: acquiring user information corresponding to the target user identifier, and determining the acquired user information as target user information; searching to-be-matched user information matching the target user information from at least one preset item of to-be-matched user information; extracting a user identifier corresponding to the to-be-matched user information searched out; and adding the extracted user identifier to the set of user identifiers.

6. The method according to claim 5, wherein the generating the set of user identifiers further comprises:

extracting a user identifier not processed by the steps of processing a user identifier from the set of user identifiers, determining the extracted user identifier not processed by the steps of processing a user identifier as the target user identifier, and continuing to perform the steps of processing a user identifier.

7. An apparatus for identifying a risky user, comprising:
at least one processor; and
a memory storing instructions, which when executed by the at least one processor, cause the at least one processor to perform operations, the operations comprising:

extracting historical published information of users indicated by user identifiers in a preset set of user identifiers; and for each user indicated by each of the user identifiers in the set of user identifiers, performing following steps of identifying a risky user: extracting a feature vector from the historical published information of the user, inputting the extracted feature vector to a pre-trained information identifying model to obtain an information identifying result corresponding to the historical published information of the user, the information identifying model being used to characterize a corresponding relation between the feature vector and the information identifying result, and determining the user as a risky user, in response to the information identifying result corresponding to the historical published information of the user indicating the historical published information of the user as risk information;

wherein the operations further comprise:

using the historical published information indicated as risk information by the information identifying result as historical risk information, and generating a set of historical risk information;

receiving an information publishing request sent by a to-be-identified user, the information publishing request including to-be-published information;

comparing the to-be-published information with the historical risk information in the set of historical risk information; and determining the to-be-published information as risk information, and determining the to-be-identified user as a risky user, in response to the to-be-published information matching at least one item of the historical risk information; and wherein after the determining the to-be-identified user as a risky user, the operations further comprise:

determining the historical published information indicated as non-risk information by the information identifying result as historical non-risk information; and updating the information identifying model, by using the historical risk information, the historical non-risk information and the to-be-published information as training samples.

8. The apparatus according to claim 7, wherein after the receiving an information publishing request sent by a to-be-identified user, the operations further comprise:

extracting a feature vector from the to-be-published information;

inputting the extracted feature vector to the information identifying model to obtain an information identifying result corresponding to the to-be-published information; and determining the to-be-identified user as a risky user, in response to the information identifying result corresponding to the to-be-published information indicating the to-be-published information as risk information.

9. The apparatus according to claim 7, wherein after the determining the to-be-identified user as a risky user, the operations further comprise:

extracting user information and a user identifier of the to-be-identified user;

comparing the user information of the to-be-identified user with user information corresponding to the user identifiers in the set of user identifiers; and adding the user identifier of the to-be-identified user to the set of user identifiers, in response to determining the user information of the to-be-identified user not matching the user information corresponding to the user identifiers in the set of user identifiers.

10. The apparatus according to claim 9, wherein after the adding the user identifier of the to-be-identified user to the set of user identifiers, the operations further comprise:

searching to-be-matched user information matching the user information of the to-be-identified user from at least one pre-acquired item of to-be-matched user information;

extracting a user identifier corresponding to the to-be-matched user information searched out; and adding the extracted user identifier to the set of user identifiers.

11. The apparatus according to claim 7, wherein before the extracting historical published information of users indicated by user identifiers in a preset set of user identifiers, the operations further comprise generating the set of user identifiers, and the generating the set of user identifiers comprises:

extracting a user identifier of at least one preset historical risky user, and generating the set of user identifiers;

extracting one user identifier from the set of user identifiers as a target user identifier, and performing following steps of processing a user identifier: acquiring user information corresponding to the target user identifier, and determining the acquired user information as target user information; searching to-be-matched user information matching the target user information from at least one preset item of to-be-matched user information; extracting a user identifier corresponding to the to-be-matched user information searched out; and adding the extracted user identifier to the set of user identifiers.

12. The apparatus according to claim 11, wherein the generating the set of user identifiers further comprises:

extracting a user identifier not processed by the steps of processing a user identifier from the set of user identifiers, determining the extracted user identifier not processed by the steps of processing a user identifier as the target user identifier, and continuing to perform the steps of processing a user identifier.

13. A non-transitory computer readable storage medium storing a computer program, wherein the computer program when executed by a processor, causes the processor to perform operations, the operations comprising:

extracting historical published information of users indicated by user identifiers in a preset set of user identifiers; and for each user indicated by each of the user identifiers in the set of user identifiers, performing following steps of identifying a risky user: extracting a feature vector from the historical published information of the user, inputting the extracted feature vector to a pre-trained information identifying model to obtain an information identifying result corresponding to the historical published information of the user, the information identifying model being used to characterize a corresponding relation between the feature vector and the information identifying result, and determining the user as a risky user, in response to the information identifying result corresponding to the historical published information of the user indicating the historical published information of the user as risk information;

wherein the operations further comprise:

using the historical published information indicated as risk information by the information identifying result as historical risk information, and generating a set of historical risk information;

receiving an information publishing request sent by a to-be-identified user, the information publishing request including to-be-published information;

comparing the to-be-published information with the historical risk information in the set of historical risk information; and determining the to-be-published information as risk information, and determining the to-be-identified user as a risky user, in response to the to-be-published information matching at least one item of the historical risk information; and wherein after the determining the to-be-identified user as a risky user, the operations further comprise:

determining the historical published information indicated as non-risk information by the information identifying result as historical non-risk information; and updating the information identifying model, by using the historical risk information, the historical non-risk information and the to-be-published information as training samples.

* * * * *